RECORDING APPARATUS

Filed April 3, 1962 3 Sheets-Sheet 1

INVENTORS
CHARLES H. DOERSAM JR.
ROBERT W. KING JR.

BY

ATTORNEY

INVENTORS
CHARLES H. DOERSAM JR.
ROBERT W. KING JR.
BY [signature]
ATTORNEY

RECORDING APPARATUS

Filed April 3, 1962 3 Sheets-Sheet 3

INVENTOR.
CHARLES H. DOERSAM JR.
ROBERT W. KING JR.
BY
[signature]
ATTORNEY

United States Patent Office 3,158,426

Patented Nov. 24, 1964

3,158,426
RECORDING APPARATUS

Charles H. Doersam, Jr., and Robert W. King, Jr., Port Washington, N.Y., assignors to Sperry Rand Corporation, Great Neck, N.Y., a corporation of Delaware Filed Apr. 3, 1962, Ser. No. 184,839
9 Claims. (Cl. 346—20)

This invention relates in general to data recording apparatus and more particularly to improvements therein.

Data recording apparatus embodying the present invention relies on the principle that the nature of successive data samples need be recorded only if each such sample differs significantly from the next earlier sample and if the times of occurrence of such sample differences are recorded also.

A typical environment for a recorder embodying the invention is in recording flight data. Present practice is to make a continuous record of various flight parameters from the beginning of a flight to its end, even though the parameters remain unchanged for the duration of the flight. Such technique requires extensive recording apparatus which is both expensive and heavy. A recorder employing the present invention, on the other hand, may be quite small since it records only data changes and their times of occurrence.

The presently preferred form of recording apparatus utilizes digital techniques and compares continuously successive digital words representing the values of a particular parameter. Should any two successive digital words be different, only the later occurring word is recorded along with its time of occurrence.

Aside from the above-mentioned general concept, the apparatus of the present invention includes a novel storage technique, this technique employing a circulating memory of one word capacity in such a way that the bits of digital words representing one sampling of several parameters are interlaced for simultaneous occupancy of the memory.

A principal object of the invention is to provide apparatus for recording data, such data being variable with respect to time and being recorded only when it changes.

Another object of the invention is to provide a device for recording data and the time of such recording only when such data changes.

Another object of the invention is to provide data storage equipment for interlacing, according to a predetermined pattern, the bits of digital words representing the values of several different parameters.

Figures 1, 3:
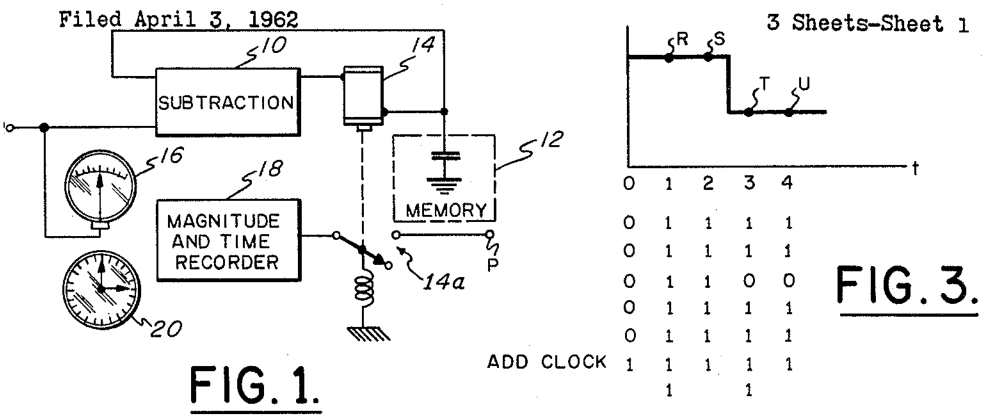
Figure 2:
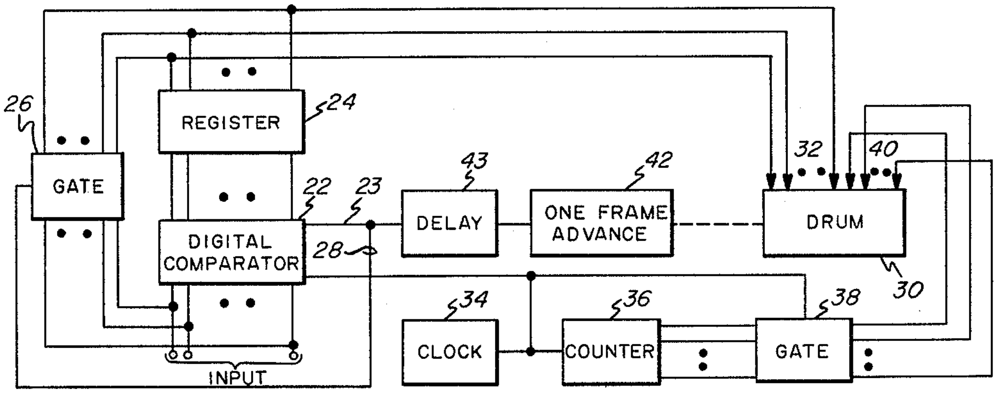
Figure 4:
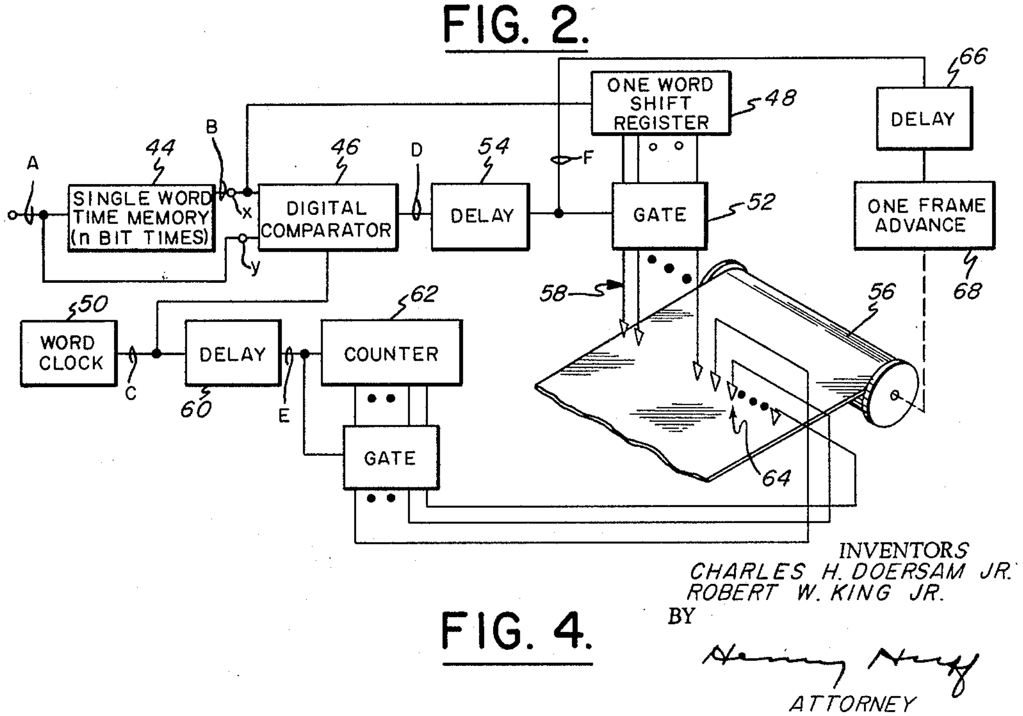
Figure 7:
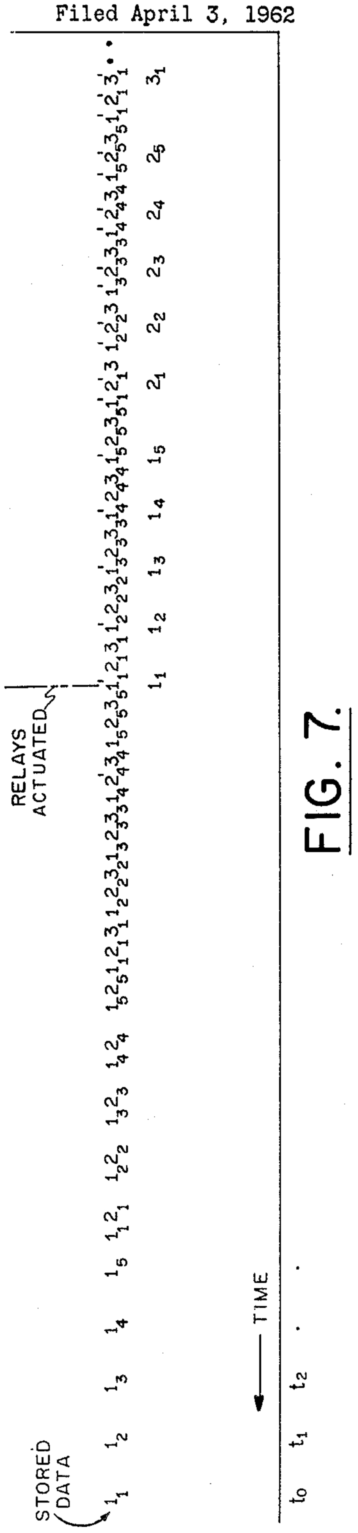
Figure 5:
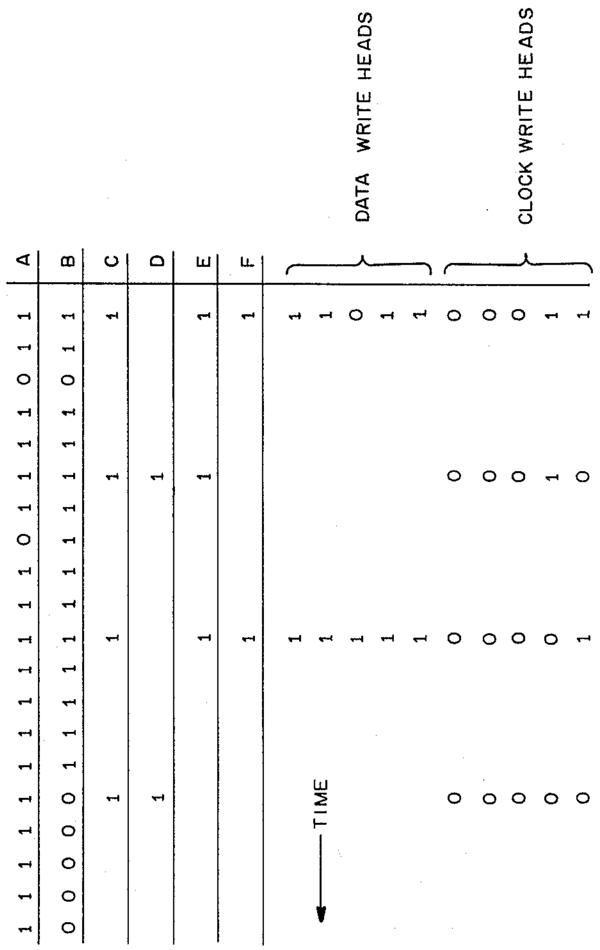
Figure 6:
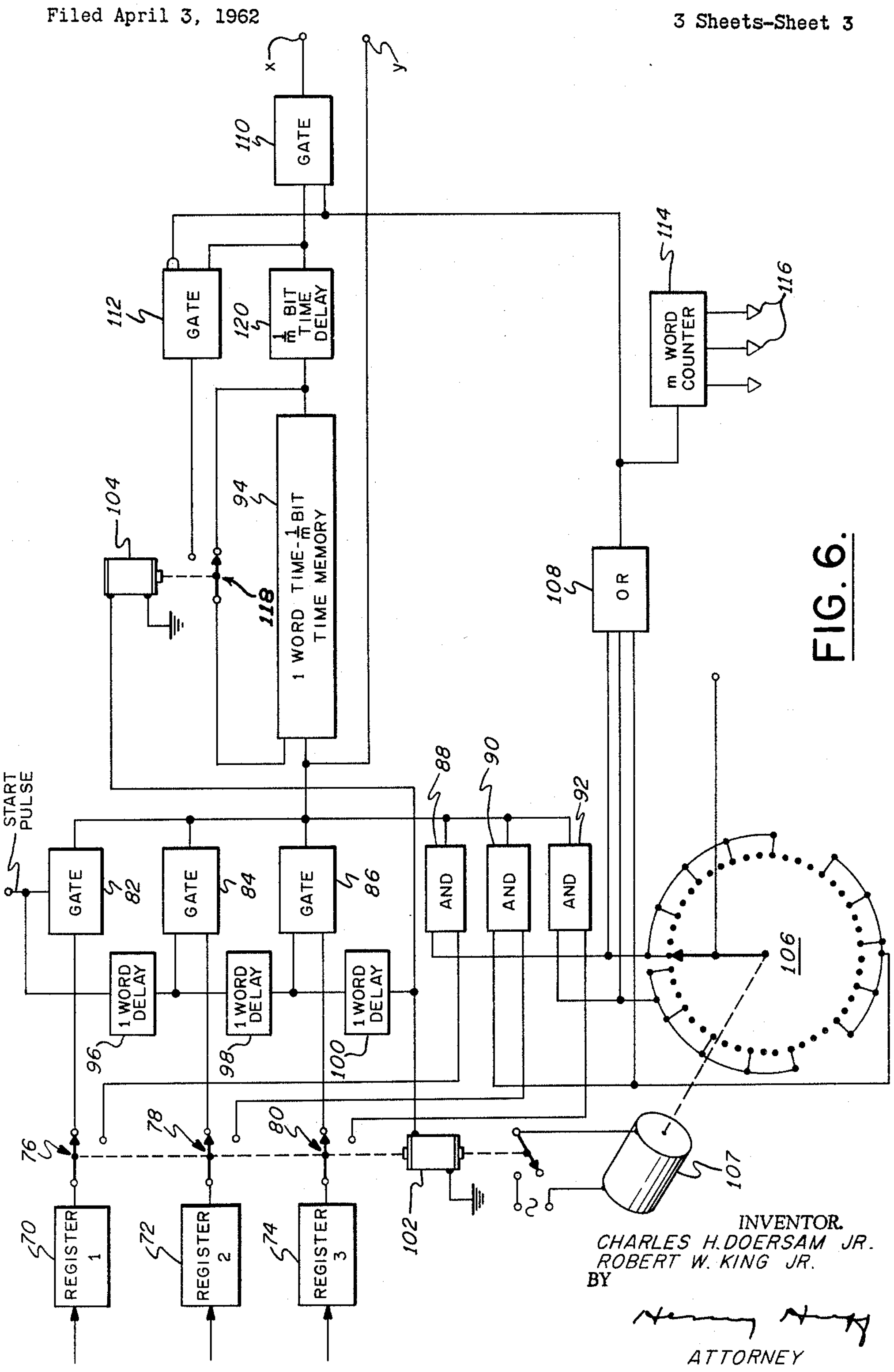

The invention will be described with reference to the figures wherein:

FIG. 1 is a diagram of a simple embodiment of the present invention,

FIG. 2 is a block diagram of a digital form of the invention with parallel read and write features, FIG. 3 is a diagram useful in describing the apparatus of FIG. 2, FIG. 4 is a block diagram of a serialized digital form of the invention, FIG. 5 is a diagram useful in describing the apparatus of FIG. 4, FIG. 6 is a block diagram of a circuit which, when substituted for part of the apparatus shown in FIG. 4, provides the presently preferred form of the invention, and FIG. 7 is a diagram useful in describing the operation of the apparatus of FIG. 6.

FIG. 1 is set forth in an attempt to provide an easy-to-understand embodiment of the general philosophy employed in all forms of the invention. In FIG. 1, a subtraction circuit 10, adapted to receive a signal representing a changeable parameter, has its output signal applied to a memory device 12, e.g., a capacitor, and fed back to cancel the received signal. The memory device 12 has its input signal applied through a current detector, i.e., a relay 14, which, when actuated, closes a switch *14a*. The subtraction circuit input signal is applied also to a meter 16. A magnitude and time recorder 18, responsive to a signal applied at point P, records the meter 16 indication and the time of such recording, time being provided by a clock 20. The magnitude and time recorder 18 may be a camera adapted to take a picture of the meter 16 and clock 20 faces whenever the detector relay 14 is actuated.

With a parameter representative variable voltage applied to the subtraction circuit 10, the memory device 12 capacitor charges to the value of the applied voltage. In addition, the current detecting relay 14 becomes energized as the memory 12 capacitor charges up, thereby closing the switch *14a* and causing the recorder 18 to make a first record of the applied voltage and the START time. Then, when the capacitor becomes fully charged, the switch *14a* releases. As the applied voltage changes in magnitude, the subtraction circuit 10 produces an output signal that changes the level of the feedback voltage and the charge stored on the memory 12 capacitor. Each time the memory 12 capacitor charge changes, the relay 14 becomes energized, thereby causing the recorder 18 to record the meter indication and the time of such recording.

The digital form of the invention shown in FIG. 2 has a digital comparator 22 adapted to receive in parallel the bits of a digital word representing the instantaneous value of a particular parameter. The comparator 22, which may be either a half adder with all of its output leads connected together to form a single bus 23 or an EXCLUSIVE OR circuit of the type described in Handbook of Automation, Computation and Control, vol. 2, page 5–18, John Wiley and Sons, Inc., New York, also receives in parallel the bits of a digital word stored in a register 24. A gate 26, receiving the bits of the digital word representing the instantaneous value of the parameter, applies its received bits to the register 24 only when the comparator 22 provides an output signal on line 28, the gate 26 output bits being written also at this time on a magnetic drum 30 in the form of magnetically polarized cells by means of write heads 32, which may all be like the write head shown and described on page 238 of Digital Computer Fundamentals, Thomas C. Bartee, McGraw-Hill Book Company, Inc., New York, 1960, Library of Congress Catalog Card No. 60–8824. A clock pulse generator 34, e.g., an oscillator, producing output pulses at the same rate that the parameter in question is sampled, applies its output pulses to a counter 36 to produce a time count, such time count being passed through a gate 38 at the clock pulse rate and written on the drum 30 by write heads 40. (Write heads 40 may be like write heads 32.) In other words, the counter 36 counts from "time=zero" on upward, and provides on its output leads a digital word or count indicative of instantaneous time, this being because such word changes at the clock pulse rate. Because the gate 38 opens at the clock rate, these time indicative words are applied to the write heads 40, causing same to record continually higher and higher time counts on the drum 30. However, because the drum 30 is only rotated a frame at a time, and then only when line 23 has an output pulse thereon, individual time counts are not permanently stored on the drum 30 and instead continually vanish. When the drum advances one frame, however, the time count which last appeared (prior to such advance) at the output of the gate 38 gets permanently recorded. The digital comparator 22 output signal, if any, is applied through a momentary delay 43 to a device 42 connected to advance the drum 30 one frame on receipt of an applied signal, such device being either a motor drive mechanism or a relay mechanism such as is employed in stepping switches.

With a first variable representative digital word applied to the digital comparator 22 and with nothing stored in the register 24, the comparator 22 instantly produces an output signal which gates the applied first digital word into the register 24 and causes a record to be made thereof on the drum 30. At the same instant, a first time count is written by the write heads 40. After the write heads 32 and 40 write their respective data, the digital comparator 22 output signal exits from the delay device 43 and causes the device 42 to advance the drum 30 by one frame. The next digital word applied to the comparator, if identical to the word stored in the register 24, causes no output signal to be produced by the comparator 22 and no new data word to be written by the write heads 32. However, the write heads 40 continue to write time counts produced by the counter 36, i.e., successive time counts are written continually over each other so long as no new data word is written by the write heads 32. With a digital word representing a new value of the parameter in question being applied to the digital comparator 22, i.e., with the third digital word applied to the comparator 22 being different from the first two words, the comparator produces an output signal on the line 28 which causes the new word to be gated into the register 24 and written on the drum 30. Then the comparator output signal exits from the delay device 43 to cause a one frame advance of the drum 30, thereby bringing a new frame address under the write heads 32. With the fourth digital word the same as the third digital word, no new data is written and the drum 30 remains stationary. FIG. 3 shows diagrammatically digital words representing a START condition and four successive samplings (R, S, T, U) of a variable which changes with respect to time, the first two and the last two samplings being respectively alike.

Referring to FIG. 4, digital apparatus adapted to have data words serially read in has a memory device 44 which must be of a type that progressively translates its applied bits from its input to its output in one word-time, and be of such size that all bits in any given data word just fit therein. (The memory device 44, therefore, emits a given bit one word-time after that bit is received.) The memory device 44, which may for example be an acoustical delay line, applies its output bits to a digital comparator 46 similar to the comparator 22; the comparator 46 also receives the bits applied to the memory device 44 and produces an output signal only when its applied words differ significantly. A shift register 48, e.g., the shift register shown and described in Arithmetic Operations in Digital Computers, R. K. Richards, D. Van Nostrand Company, Inc., New York, page 145, receiving the memory device 44 output words also, is adapted to contain exactly the same number of bits as is in any given digital word. A clock pulse generator 50 produces pulses one word-time apart and applies them to the digital comparator 46, thereby causing the comparator 46 to compare its two applied digital words at word-time intervals.

Should the digital words serially read into the comparator 46 differ, an output pulse is emitted from the comparator 46 and applied to a gate circuit 52 through a delay device 54. The delay device 54 delays its applied signal one word-time. With the gate 52 open, the bits of the digital word stored in the register 48 pass therethrough and are written on a magnetic storage tape 56 by means of write heads 58.

The clock pulses emanating from the clock pulse generator 50 are applied through a one word-time delay device 60 to a counter 62 which provides a time count in digital form, such count being written by write heads 64 at the clock pulse rate. The pulses which effect operation of the write heads 58, i.e., the pulses applied to the gate 52, are applied also through a momentary delay device 66 to a one frame advance mechanism 68 that causes the tape to advance slightly after each recording.

FIG. 5 shows how the apparatus of FIG. 4 would handle the situation presented in FIG. 3. With both the comparator 46 and the register 48 cleared and nothing stored in the memory device 44, application of the first word 11111 to the memory device 44 and to the comparator 46 causes the comparator 46 to produce an output pulse at the instant the last bit of that word is received. One word-time later, the bits of the first word occupy completely the stages of the register 48; at the same time the comparator 46 output pulse appears at the output of the delay device 54, thereby causing the gate 52 to open and the write heads 58 to write the word 11111. Since the word clock is delayed one word-time also, the time count 00001 is written by the write head 64 at the same time that the write heads 58 write 11111.

As the second digital word 11111 is applied to the comparator 46, the first digital word emanates from the memory device 44. These two words are compared in the comparator 46 and, since they are identical, the comparator produces no output signal. As the third digital word 11011 is applied to the comparator 46, the second digital word 11111 emanates from the memory device 44, thereby causing the comparator 46 to apply an output signal to the gate 52 at the instant the register 48 is filled with the bits of the third word. As a result the third word is gated to the write heads 58, the clock write heads 64 receiving at that time a clock count 00011. If desired, the apparatus of FIG. 4 may be modified to include a buffer memory that temporarily stores the words to be written until full, thereby cutting down on the number of times the tape need be set in motion.

Since the bits of digital words have negligible widths and finite spaces therebetween, the apparatus of FIG. 6 is provided to interlace the bits of words representing several different parameters; in this way the apparatus of FIG. 4 may be employed to provide a record of how all such parameters vary with respect to time without unduly multiplying the equipment required. Referring to FIG. 6, apparatus adapted to be connected to points X and Y of FIG. 3 (instead of element 44) has registers 70, 72 and 74, all of which are adapted to contain digital representations of different parameters; these registers apply their output words through switches 76, 78, and 80 to gate circuits 82, 84 and 86, respectively. The register 70, 72 and 74 output words are applied also to AND gates 88, 90 and 92; the gates and AND circuits have their respective output words applied to a memory device 94 which progressively translates its applied bits from its input to its output. The memory device 94, unlike the memory device 44 of FIG. 4, is adapted to translate a given bit from its input to its output in $1/m$ bit-times less than a word-time, where $m$ is the number of variables being recorded and a bit-time is the time interval that occurs between consecutive bits of a word. A START pulse, adapted to be applied to the gate 82, is successively delayed one word-time by delay devices 96, 98 and 100 before being applied to the gates 84 and 86 and self-holding relays 102 and 104. (Self-holding contacts for these relays are not shown in the interest of clarity.) The gates 82, 84 and 86 are all adapted to remain open for one word-time. The self-holding relay 102, when actuated causes the registers 70, 72 and 74 to apply their respective output words to AND circuits 88, 90 and 92 and, in addition, causes a timing device 106 to apply gating signals to those AND circuits by actuating a timing device drive mechanism 107. These gating signals are applied also to an OR circuit 108, the output signals of which open a gate 110, inhibit a gate 112, and are applied to a variable designating $m$ word counter 114, the digital count of which is written continually by write heads 116.

Before the relays 102 and 104 are actuated, the memory device 94 recirculates its output words through a switch 118, such switch being at this time in its lower position.

At the instant the relays become actuated, however, the memory device output words are passed through a $1/m$ bit-time delay device 120 and, thence, through either the gate 110 or the gate 112 depending on whether the OR circuit 108 provides an output signal. Words which pass through the gates 112 are reapplied through the switch 118 to the memory device 94, the switch 118 being at this time in its upper position.

Because the memory device is $1/m$ bit-times less than a word-time in length, the first bit of one variable word, e.g., the word from the register 70, during the initial storing process, i.e., before the relays 102 and 104 are actuated, gradually catches up to the last bit of that word. As this happens, the first bit of a second variable word, e.g., the word from the register 72, is applied to occupy the time position that the first bit, first word had originally. As this process continues, the bits of the words from the registers gradually take the time positions: first bit, first variable word; first bit, second variable word; first bit, third variable word; second bit, first variable word; second bit, second variable word, etc. At the instant the relays 102 and 104 are actuated, the memory device 94 exits sequentially the bits of the first variable word (while taking in bits representing a new sampling of that variable), then the bits of the second variable word (while taking in bits representing a new sampling of that variable), etc.

Referring now to FIG. 7, three variable words are represented by numbers 1, 2 and 3, with subscripts indicating the time positions of respective word bits. The primed numbers indicate the second sampling of the variables in question. When a START pulse is applied to the gate circuit 82, the first five bits $1_1$, $1_2$, $1_3$, $1_4$, $1_5$ in the bit train of FIG. 7 pass therethrough and into the memory device 94. Because the memory device 94 is $1/m$ bit-times shorter than a word-time in length, the $1_1$ bit, upon recirculation, starts to catch up with the $1_5$ bit. Right after the $1_1$ bit leaves its original time position, the gate 84 is opened by the delayed START pulse, thereby enabling the bits of the second variable word $2_1$, $2_2$, $2_3$, $2_4$, $2_5$ to pass therethrough. These second variable word bits then take up time positions one bit-time after corresponding bits of the first variable word. Once again, the bits of the memory device 94 are moved up one bit-time upon recirculation, thereby allowing the bits of the third variable word to occupy time positions one bit-time after corresponding bits of the second variable word. Right after, i.e., $1/m$ bit-times after the last bit of the third variable word is applied to the memory device 94, the relays 102 and 104 actuate, thereby causing the gate circuit 115 to pass the first bit of the first sampling of the first variable word as the first bit second sampling of that variable word is applied to the memory device 94; as the gate 110 receives its gate opening signal, the gate 112 receives a gate closing or inhibiting signal (which prevents recirculation of the bit $1_1$). The bits $1_1'$, $1_2'$, etc. are applied to the point Y simultaneously with the issuance of the bits $1_1$, $1_2$, etc. through the gate 110, respectively, thereby permitting the digital comparator 46 of FIG. 4 to compare successive samplings of the same variable. After the first and second samplings of the first variable are compared, the first and second samplings of the second variable are compared, i.e., $2_1$, $2_2$, etc. is compared with $2_1'$, $2_2'$, etc.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for producing a record of how a parameter is changed with respect to time comprising means producing periodically digital representations of the values of said parameter, clock means, means comparing successive digital representations of said parameter and responsive to a difference between two successive digital representations for producing an output signal, and recording means responsive to the said output signal to record the later occurring of the two compared digital representations and its time of occurrence, whereby a record is provided to show the changes of said parameter and when they occur.

2. Data recording apparatus comprising means adapted to receive and compare at predetermined time intervals successive digital words representing different samplings of a particular parameter responsive to a difference between said samplings for producing an output signal, means producing digital words representing respective sampling times, and data storage means responsive to the said output signal to store the later occurring of the words being compared and its respective time of sampling word, said data storage means thereby providing a record of how said particular parameter changes with respect to time.

3. Apparatus for providing a record of how a parameter changes with respect to time comprising memory means adapted to receive serially digital words representing periodic samplings of said parameter and progressively translate said words to its output, said memory means being such that the bits of each word exit from said memory means as the corresponding bits of the next occurring sample word are serially applied thereto, means responsive to a difference between the memory means input and output words for producing an output signal, clock means, and means responsive to said output signal to store the word being applied to said memory means and its time of occurrence.

4. Apparatus for providing a record of how a quantity represented digitally varies with respect to time comprising memory means adapted to receive serially digital words representing periodic samplings of said quantity and progressively translate said words to its output, said memory means being such that the bits of each word exit from said memory means as the bits of the next occurring sample word are serially applied thereto, means responsive to a substantial difference between the memory means input and output words for producing an output signal, clock means, and storage means responsive to the output signal from said comparing means to store the word exiting from said memory means and its time of occurrence.

5. Data recording apparatus comprising means providing digital representations of successive samples of a parameter, delay means receiving one digital representation as it exits the next earlier occurring digital representation, means receiving and responsive to a difference between said delay means applied and exiting digital representations for producing an output signal, clock means, and data storage means responsive to said output signal to store the delay means applied digital representation and the time of its occurrence, whereby a record of the changes of said parameter is stored within said storage means.

6. Data recording apparatus comprising means providing digital representations of successive samples of a parameter changeable with respect to time, delay means adapted to receive digital representation as it exits the next earlier occurring digital representation, means receiving and responding to a difference of a certain amount between said delay means applied and exiting digital representations for producing an output signal, clock means, and data storage means responsive to said output signal to store the delay means applied digital representations and the time of its occurrence, whereby a record of the changes of said parameter is stored by said storage means.

7. Apparatus for producing a record of how a plurality of parameters change with respect to time comprising means cyclically producing a serialized array of digital words representing all said parameters, said array having its digital words in the same order that they occur, first delay means adapted to delay any given bit by a word-time less a fraction of a bit-time, said fraction being equal to the reciprocal of the number of parameters, second delay means providing a delay equal to said fraction of a bit-time, said first delay means receiving said serialized array of digital words and applying all of its output words to its input for one cyclic period and thereafter to said second delay means, comparison means, storage means, said comparison means after said first cyclic period receiving a parameter representative word of one cycle at the same time that a representative word of that same parameter exits from said second delay means, all other words being reapplied to the first delay means, the parameter representative word of the later occurring cycle that is applied to said comparison means being applied to said storage means when said comparison means detects a discrepancy between its applied words, and means responsive to indicate the parameter whose representative word is applied to said storage means and the time of occurrence of that word.

8. Recording apparatus for a plurality of independent parameters, all of which may change with respect to time, comprising means cyclically producing a serialized train of digital words representing all said parameters, said train having its digital words in their order of occurrence, first delay means adapted to delay any given bit by a word-time less a fraction of a bit-time, said fraction being equal to the reciprocal of the number of parameters, second delay means providing a delay equal to said fraction of a bit-time, said first delay means receiving said serialized train of digital words and applying all of its output words to its input for one cyclic period and thereafter to said second delay means, comparison means, storage means, switching means applying to said comparison means after said first cyclic period a parameter representative word of one cycle at the same time that a representative word of that same parameter exits from said second delay means, said switching means reapplying all other words to the first delay means, the parameter representative word of the later occurring cycle that is applied to said comparison means being applied to said storage means when said comparison means detects a discrepancy between its applied words, and means responsive to indicate the parameter whose representative word is applied to said storage means and the time of occurrence of that word.

9. Apparatus for producing a record of how a parameter is changed with respect to time comprising means producing periodically representations of the values of said parameter, clock means, means comparing successive representations of said parameter and responsive to a difference between two successive representations for producing an output signal, and recording means responsive to the said output signal to record the later occurring of the two compared representations and its time of occurrence, whereby a record is provided to show the changes of said parameter and when they occur.

References Cited in the file of this patent

UNITED STATES PATENTS 3,011,853 Ilgenfritz ---------------- Dec. 5, 1961